W. F. L. BETH.
AIR OR GAS FILTER.
APPLICATION FILED MAR. 8, 1921.

1,389,482.

Patented Aug. 30, 1921.

Inventor
Wilhelm F. L. Beth
By James L. Norris
Attorney

UNITED STATES PATENT OFFICE.

WILHELM FRIEDRICH LUDWIG BETH, OF LÜBECK, GERMANY.

AIR OR GAS FILTER.

1,389,482.　　　　Specification of Letters Patent.　　Patented Aug. 30, 1921.

Application filed March 8, 1921.　Serial No. 450,633.

*To all whom it may concern:*

Be it known that I, WILHELM FRIEDRICH LUDWIG BETH, manufacturer, residing at Lübeck, Germany, have invented certain new and useful Improvements in Air or Gas Filters, for which I have filed applications in Germany, Jan. 3, 1920; in Switzerland, Dec. 24, 1920, and in Belgium, December 29, 1920, of which the following is a specification.

My invention relates to improvements in air or gas filters, such as are used for cleaning air or gas from dust and other impurities. More particularly my invention relates to improvements in that type of filters in which the filtering surface is provided by tubular elements the walls of which are adapted to be traversed by the current of air or gas, and in which the filtering elements are suspended with their open ends from a suitable supporting frame. The object of the improvements is to provide a reliable connection between the filtering elements and the supporting frame which permits the whole set of filtering elements to be shaken, beaten, or the like for removing the dust. With this object in view my invention consists in the matters to be described hereinafter and particularly pointed out in the appended claims.

Figure 1:
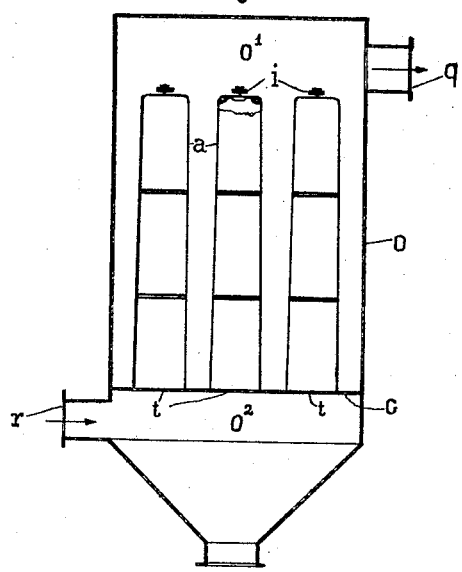

For the purpose of explaining the invention an example embodying the same has been shown in the accompanying drawing, in which the same letters of reference have been used in all the views to indicate corresponding parts. In said drawing, Figure 1, is a vertical section of the filtering apparatus.

Figure 2:
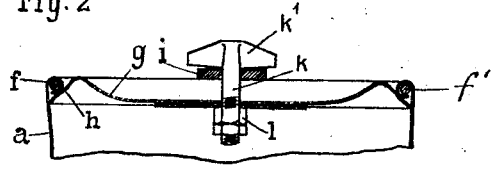
Figure 3:
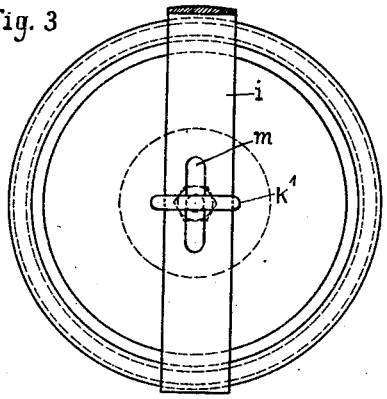

Fig. 2, is a detail sectional view showing the upper part of one of the filtering elements and the manner of suspending the same from a frame work, and Fig. 3, is a plan view of Fig. 2.

In the example shown in the figures, the filtering apparatus consists of a box or casing $o$ divided by a horizontal partition $c$ into an upper chamber $o^1$ and a lower chamber $o^2$. The upper chamber has an air outlet $q$ and the lower chamber an air inlet $r$. Within the upper chamber $o^1$ there are horizontal bars $s$ from which a suitable number of tubular filtering elements $a$ are suspended which elements cover with their open bottom ends holes $t$ made in the partition $c$.

As shown more particularly in Figs. 2 and 3, the filtering element $a$ is made at its upper end with a reduced inner diameter preferably by providing the same with an inner bead or flange $f$ which is strengthened by suitable means such as a ring $f^1$ of wire. The said bead provides an annular shoulder engaging the upper surface of a disk $g$. In the construction of the element the said disk is inserted from the bottom end of the element and pushed upward into engagement with the bead, and in order that this can easily be done I prefer to construct the filtering element with an upwardly tapered wall.

Preferably each bar $i$ is constructed so as to support a plurality of filtering elements, and in the example shown in the figures each bar is provided with a plurality of longitudinal slits $m$, and each disk $g$ is provided with a screw bolt $k$ having a head $k^1$ in the form of a wing and adapted to be secured to the disk by two nuts $l$. For securing the disk to the bar $i$ the nuts $l$ are loosened and the bolt $k$ is turned with the wing $k^1$ in position for being inserted through the slot $m$, whereupon the bolt $k$ is again turned at a right angle and the nuts $l$ are screwed on the disk $g$.

In the preferred form shown in Fig. 2, the disk $g$ has a concave shape and it is constructed of spring metal, and it is pressed with its projecting margin into elastic engagement with the bar $i$. In addition, the outer portion $h$ of the margin of the disk $i$ is conical and directed downward and outward. Therefore, when pressing the inner concave part upward by the bolt $k$ the spring action of the disk causes a horizontal component tending to force the margin outward and below the bead $f$ so as to prevent the bead from slipping off the margin of the disk.

While in describing the invention reference has been made to an example in which the elastic connection between the disk $g$ and the bar $i$ is provided by constructing the disk of elastic material I wish it to be understood that my invention is not limited to this construction. In some cases I provide an elastic member such as a washer between the wings $k^1$ and the bar $i$ or between the nuts $l$ and the disk $g$. Also in other respects various changes may be made in the construction of the filtering element and the manner of suspending the same without departing from my invention.

I claim:

1. In a filtering apparatus, an upright filtering bag formed at the innerside of its upper end with a rolled flange embracing a stiff ring and so reducing the inner diameter, a disk engaging the flange from below, and means for supporting said disk.

2. In a filtering apparatus, an upright filtering bag formed at the innerside of its upper end with a rolled flange embracing a stiff ring and so reducing the inner diameter, a disk engaging the flange from below, and holding means for said disk, said disk and holding means being elastically connected with each other.

3. In a filtering apparatus, an upright filtering bag formed at the innerside of its upper end with a rolled flange embracing a stiff ring and so reducing the inner diameter, a concave elastic disk engaging the flange from below, supporting means for said bag bearing on the margin of the disk, and means engaging the concave part of the disk and the supporting means for forcing the same together.

4. In a filtering apparatus, an upright filtering bag formed at the innerside of its upper end with a rolled flange embracing a stiff ring and so reducing the inner diameter, a concave elastic disk having a conical margin engaging the flange on the inside of the bag from below, supporting means for said bag bearing on the margin of the disk, and means engaging the concave part of the disk and the supporting means for forcing the same together.

5. In a filtering apparatus, a disassemblable filtering unit comprising a side portion having an inwardly extending flange, a supporting bar, said side portion abutting said supporting bar, an elastic cover engageable with said flange and single means for drawing said disk against said flange and said side portion against said supporting bar.

6. In a filtering apparatus, a disassemblable filtering unit comprising a side portion having an inwardly extending flange, a supporting bar, said side portion abutting said supporting bar, an elastic cover engageable with said flange, single means for drawing said disk against said flange and said side portion against said supporting bar, said means and said supporting bar having coöperating locking means.

In testimony whereof I have affixed my signature in presence of two witnesses.

WILHELM FRIEDRICH LUDWIG BETH.

Witnesses:
    EDUARD WILHELM STRAUS,
    WILHELM OTTO.